(12) United States Patent
Krowech et al.

(10) Patent No.: US 7,237,806 B2
(45) Date of Patent: Jul. 3, 2007

(54) EXPANSION SEAL

(76) Inventors: Robert J. Krowech, 7510 Market Place Dr., Eden Prairie, MN (US) 55344; Darryl M. Nagel, 7510 Market Place Dr., Eden Prairie, MN (US) 55344; Douglass R. Yaeger, 7510 Market Place Dr., Eden Prairie, MN (US) 55344

( * ) Notice: Subject to any disclaimer, the term of this patent is extended or adjusted under 35 U.S.C. 154(b) by 0 days.

(21) Appl. No.: 11/295,580

(22) Filed: Dec. 7, 2005

(65) Prior Publication Data
US 2007/0126229 A1 Jun. 7, 2007

(51) Int. Cl.
*F16L 3/04* (2006.01)
(52) U.S. Cl. .................. 285/136.1; 285/196; 277/598; 277/603
(58) Field of Classification Search ............ 285/136.1, 285/189, 194–196; 277/598, 602–603; 52/220.8
See application file for complete search history.

(56) References Cited
U.S. PATENT DOCUMENTS

| | | |
|---|---|---|
| 1,914,741 A | 6/1933 | Gysling |
| 3,136,557 A | 6/1964 | Tauscher |
| 3,228,673 A | 1/1966 | Hinks |
| 4,140,338 A | 2/1979 | Kazmierski et al. |
| 4,270,760 A * | 6/1981 | Greiman ............... 277/350 |
| 4,273,365 A | 6/1981 | Hagar |
| 5,876,042 A | 3/1999 | Graf et al. |
| 6,460,893 B1 | 10/2002 | McGrath |
| 6,834,998 B2 | 12/2004 | Hinks |

* cited by examiner

Primary Examiner—Aaron Dunwoody
Assistant Examiner—Fannie C. Kee
(74) Attorney, Agent, or Firm—Richard C. Litman

(57) ABSTRACT

A hot gas seal for a conduit penetrating the wall(s) of a vessel such as a heat recovery steam generator unit. The seal includes three serially-arranged, independent insulation segments or pillows. The pillow adjacent the vessel casing and the center pillow employ metal sheets to sandwich insulation therebetween. The center pillow travels laterally with the conduit. The third or outer pillow terminates in a split seal ring having a containment structure attached thereto.

12 Claims, 9 Drawing Sheets

EXPANSION SEAL

BACKGROUND OF THE INVENTION

1. Field of the Invention

The present invention generally relates to sealing devices. More specifically, the present invention is drawn to a hot gas seal for a conduit or the like, which conduit is inserted in a wall of a heat recovery steam generator or the like.

2. Description of the Related Art

Large diameter conduits are utilized to effectively and efficiently transport fluids (gases or liquids) to and from pressure vessels such as heat recovery steam generators. These large conduits must penetrate the walls of the pressure vessel and enter the vessel through a gap formed through the casing of the vessel. Usually, because of thermal expansion and contraction, the conduits are subject to lateral and axial movement. This movement plays havoc with the hot gas seals installed on the conduit and casing, eventually causing the seals to fail. Seal failure may require shutdown and replacement, thereby creating downtime, a safety hazard due to leaking gases at very high temperatures and economic losses due to escape of the working fluid. The seal failure is especially pernicious if the lateral movement of the conduit is greater than 2 inches. Currently available commercial seals typically do not accommodate more than 2 inches of lateral movement due to space limitations. Axial and lateral movement must be considered simultaneously. In the related art, this has resulted in seals that are excessively long and/or wide. The art would certainly welcome an effective hot gas seal that could withstand the rigors caused by lateral movement greater than 2 inches and unlimited axial movement with high reliability in a relatively small space.

The related art is rife with means for sealing pipes that penetrate vessel walls. Pertinent examples of such related art are identified and cited in the accompanying IDS. However, none of the identified and cited related art, taken either singly or in combination, is seen to disclose a hot gas expansion seal as will subsequently be described and claimed in the instant invention.

SUMMARY OF THE INVENTION

The present invention is drawn to a hot gas seal for a conduit or the like penetrating the wall(s) of a vessel such as a heat recovery steam generator unit. The seal will permit lateral movement greater than 2 inches (typically 2" to 10") and unlimited axial movement without seal degradation and failure. The instant seal has a life expectancy of at least ten years. The seal includes three serially-arranged, independent insulation segments or pillows. The pillow adjacent the vessel casing and the center pillow employ metal sheets to sandwich insulation therebetween. The third or outer pillow terminates in a split seal ring having a containment housing attached thereto.

Accordingly, the invention presents a hot gas seal that is effective, efficiently designed and durable. The seal does not require flexible metal, fabric or rubber and is not attached to the penetrating conduit. The present invention provides for improved elements thereof in an arrangement for the purposes described that are inexpensive, dependable and fully effective in accomplishing their intended purposes.

A clear understanding of the present invention will become readily apparent upon further review of the following specification and drawings.

DETAILED DESCRIPTION OF THE PREFERRED EMBODIMENT

Figure 1:
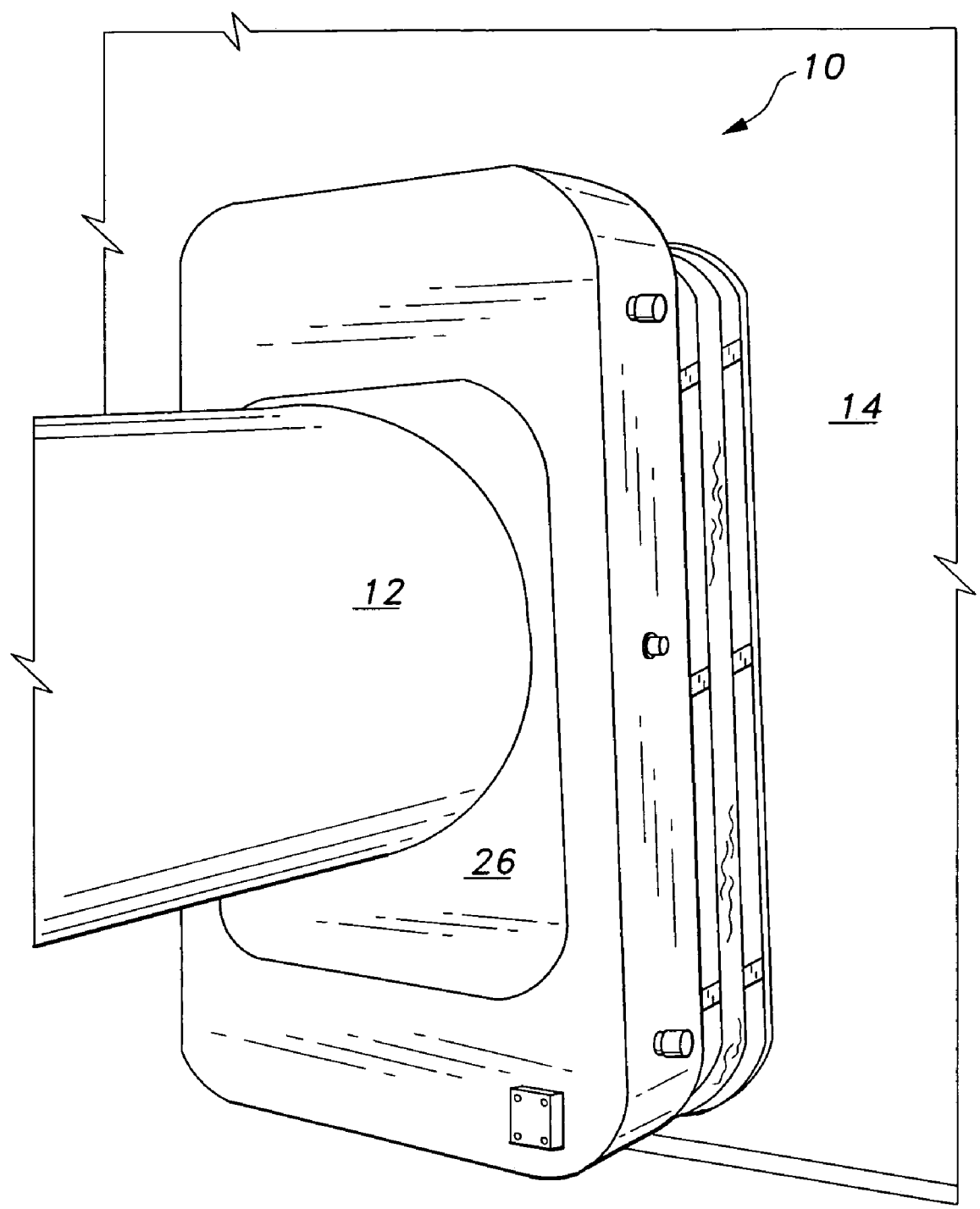
FIG. 1 is an environmental, perspective view of an expansion seal according to the present invention.

Attention is first directed to FIG. 1 wherein the seal of the present invention is generally indicated at 10 and is installed on a horizontal conduit 12, which conduit penetrates the casing 14 of a heat recovery steam generator. The seal 10 is welded in place on casing 14. Although illustrated as employed on a horizontal conduit, it is contemplated that the seal of the present invention can be utilized on lines oriented at other angles and on expansion objects other than fluid-carrying lines.

Figure 2:
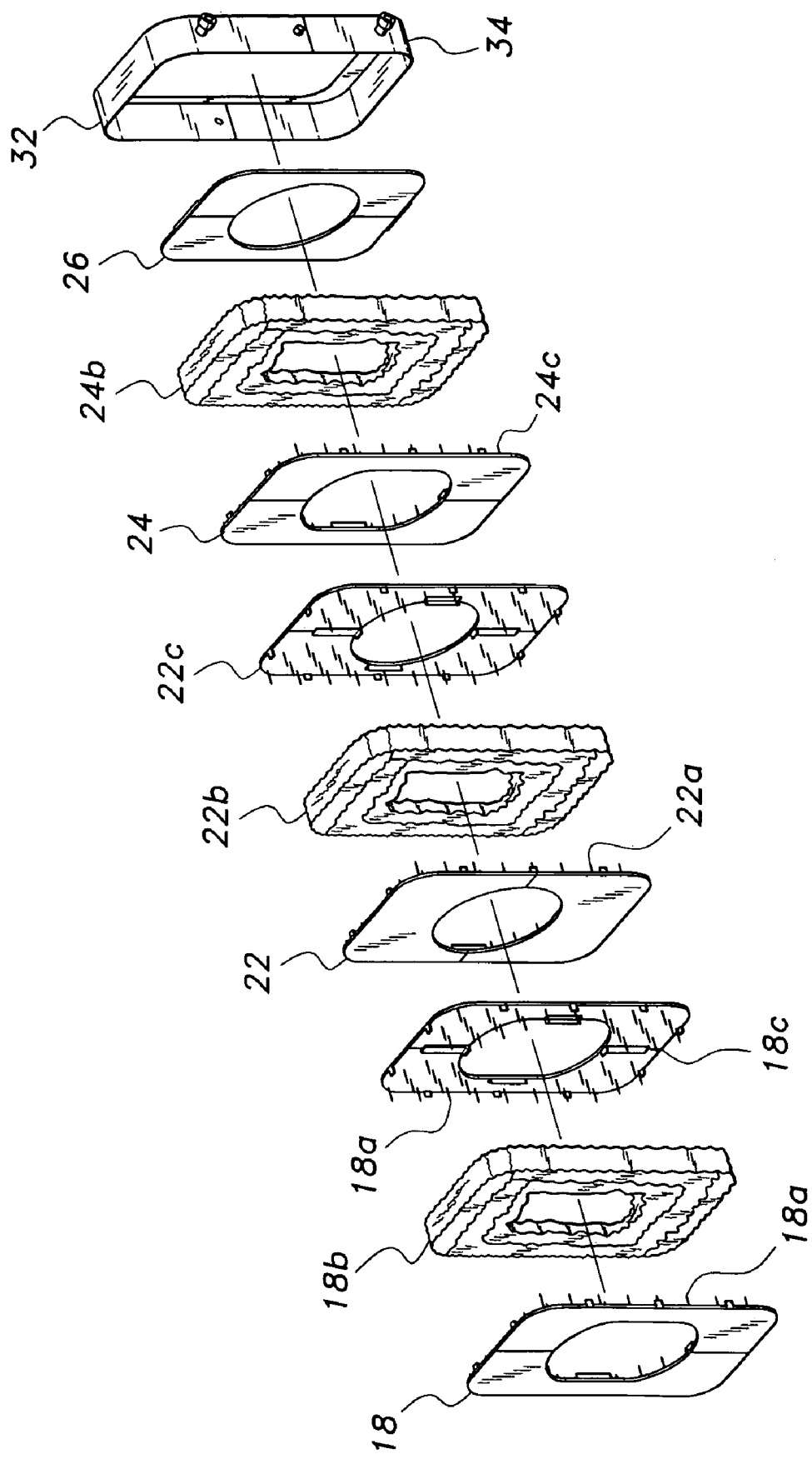
FIG. 2 is a schematic view showing the construction arrangement of the various parts according to the present invention.

The schematic illustrated in FIG. 2 shows the serial arrangement of the three, independent, insulation pillows of seal 10. The first or casing pillow comprises a first sheet 18, insulation material 18*b* and a second cover sheet 18*c*. Metal pins 18*a*, welded on the front face of sheet 18 and the rear face of cover sheet 18*c*, function to hold insulation material 18*b* in place. When installed, the casing pillow will abut the pressure vessel casing 14. The middle pillow or traveling pillow is arranged identically to the casing pillow and employs a first sheet 22, insulation material 22*b* and cover sheet 22*c*. Pins 22*a* are arranged on opposed faces of sheets 22 and 22*c* for holding insulation 22*b* in place. When installed, the traveling pillow will abut the casing pillow. The third pillow or seal pillow comprises a sheet 24, insulation material 24*b* and a split seal ring structure 26. Sheet 24 is provided with pins 24*c* on its face for holding insulation material 24*b* in place. All of the sheets (18, 18*c*, 22, 22*c* and 24) are fabricated from sheet metal and are constructed in two halves to allow mounting on existing conduit 12. For new construction, or where the end of the conduit is exposed, halving the sheets is not necessary. The orientation of the split in the halves is varied from vertical to horizontal in each successive pillow. When installed, containment housings 32, 34 are used to compress the pillows and hold the split seal ring. The containment housings form a pressure boundary that is welded to the casing. The first and third pillows have large clearance openings relative to conduit 12 in the direction of lateral growth and do not move. The center or traveling pillow and the split seal ring have a moderately close tolerance fit to allow lateral movement with the conduit. This arrangement prevents the insulation from being compressed or crushed in any of the pillows.

Figure 3:
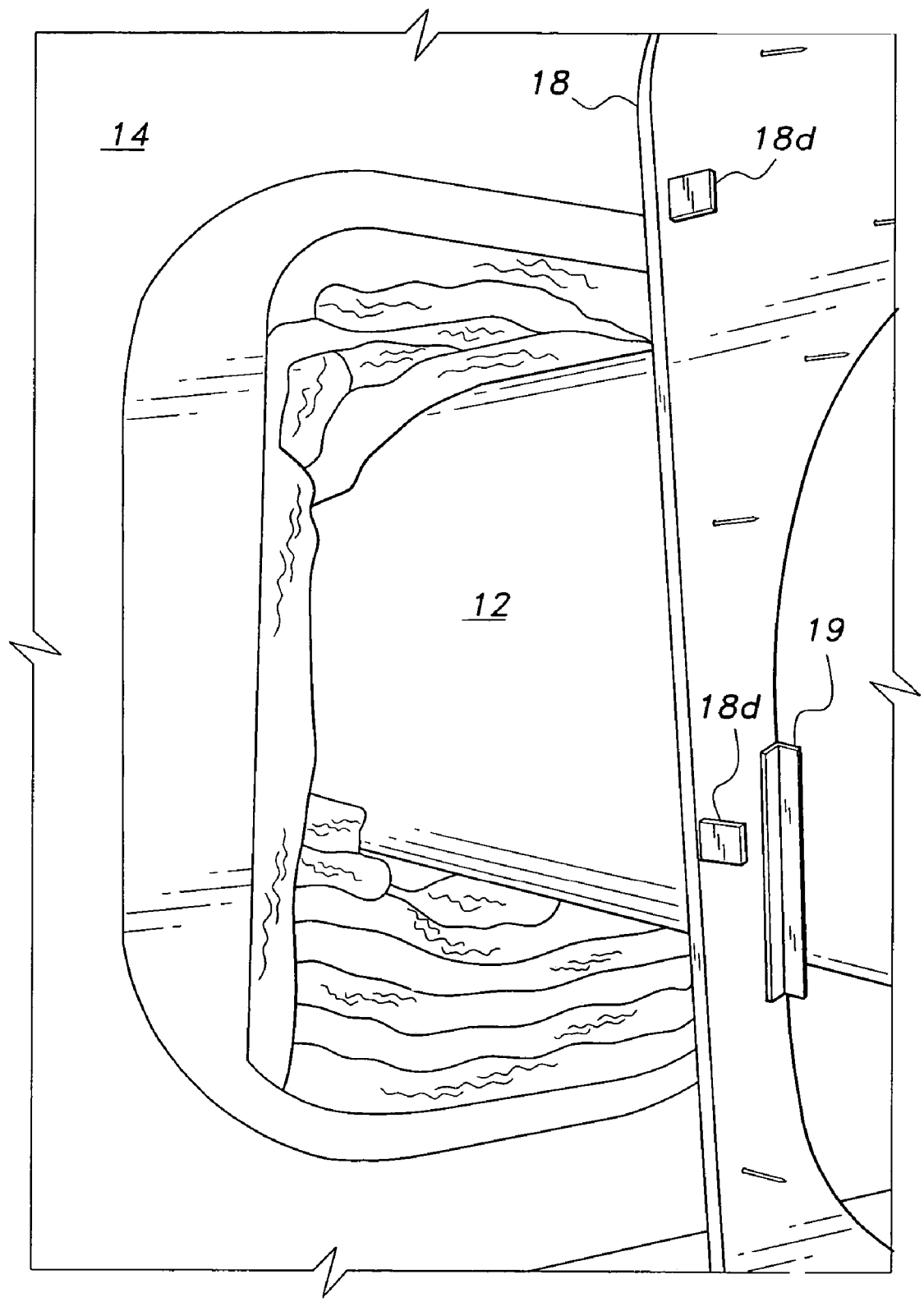
FIG. 3 is a partial, perspective view showing the first sheet of the casing pillow positioned on the conduit according to the present invention.
Figure 4:
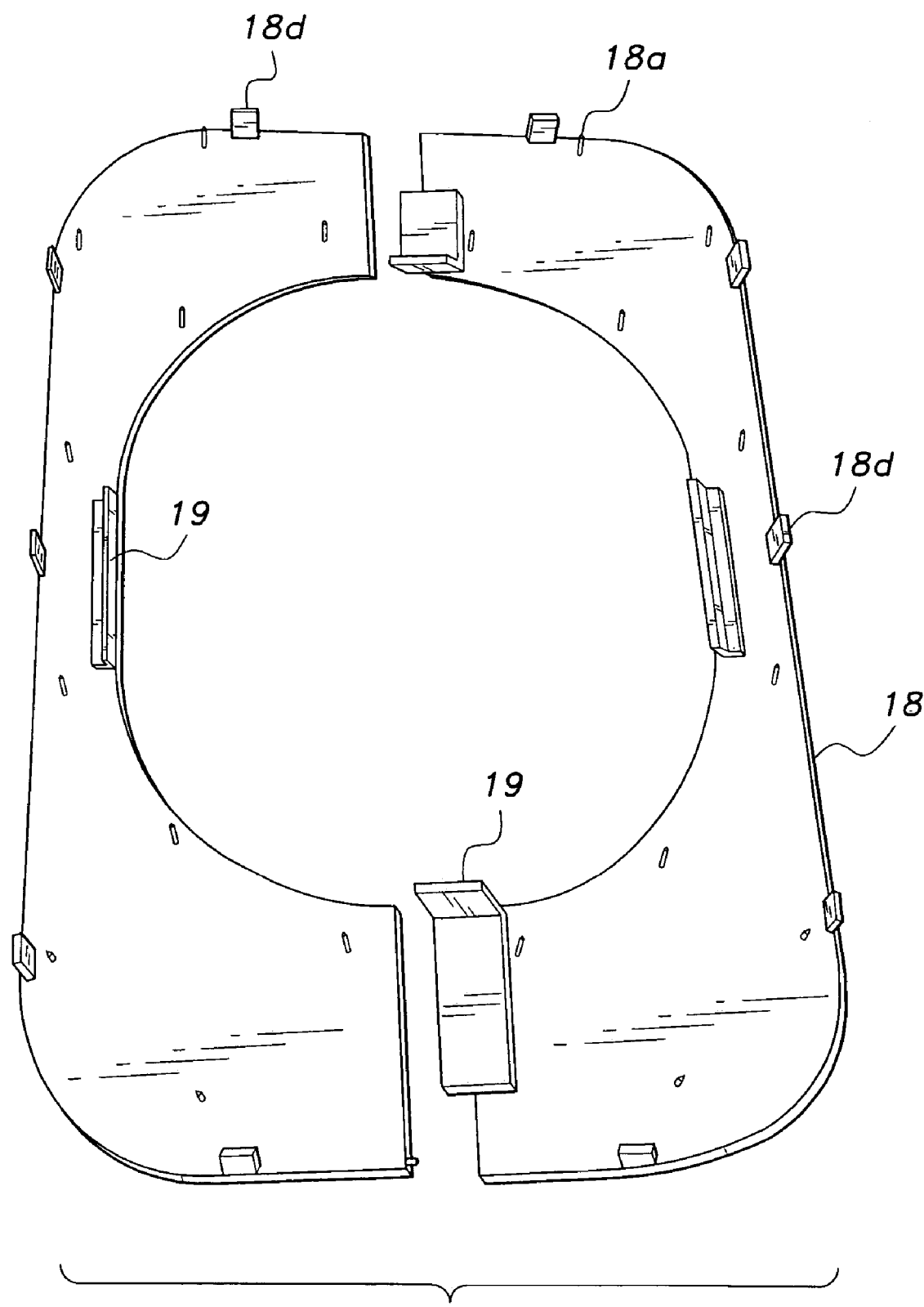
FIG. 4 is a perspective view showing the first sheet of the casing pillow halved along a vertical axis according to the present invention.
Figure 5:
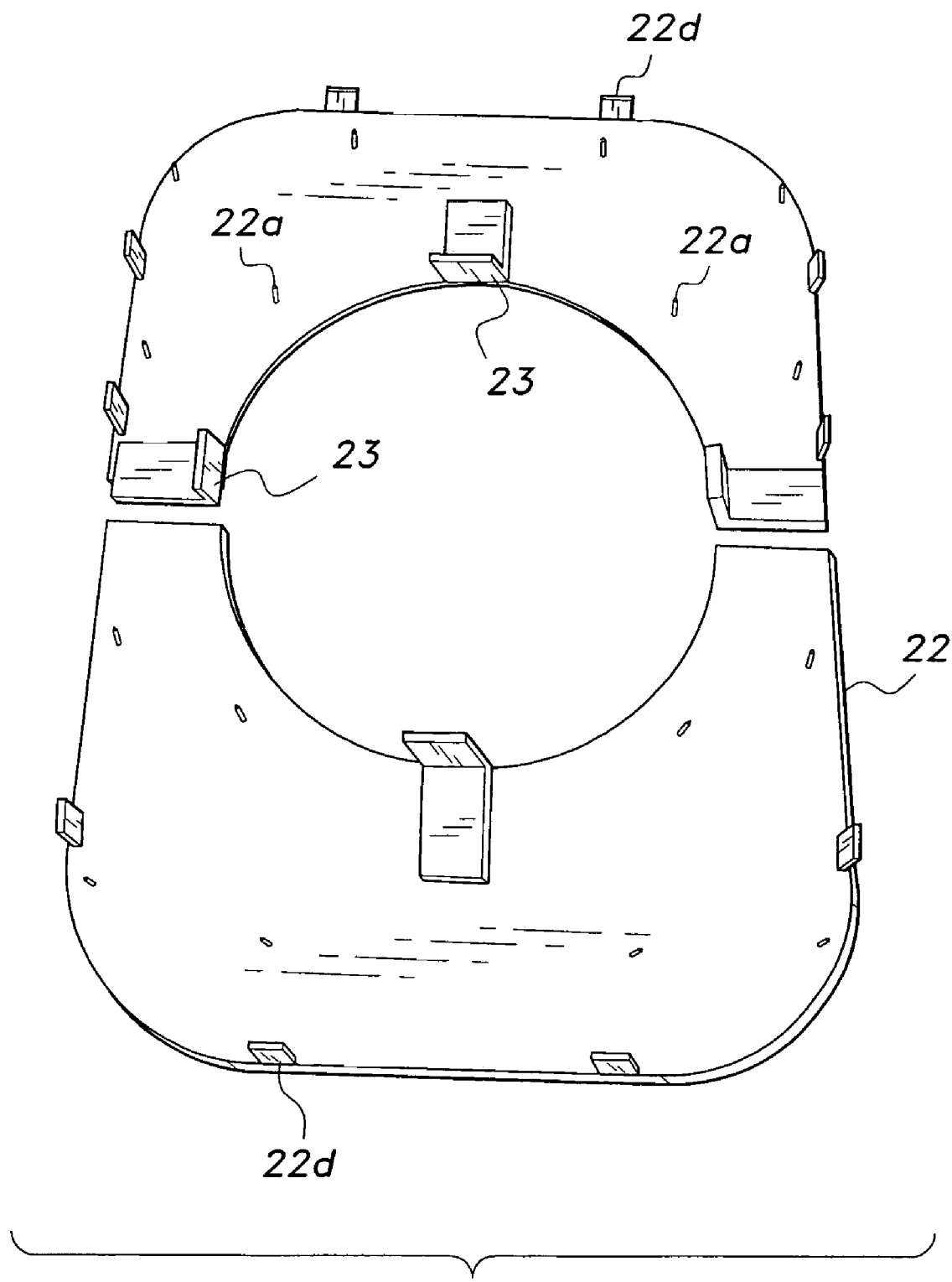
FIG. 5 is a perspective view showing the cover of the center or traveling pillow halved along a horizontal axis according to the present invention.
Figure 6:
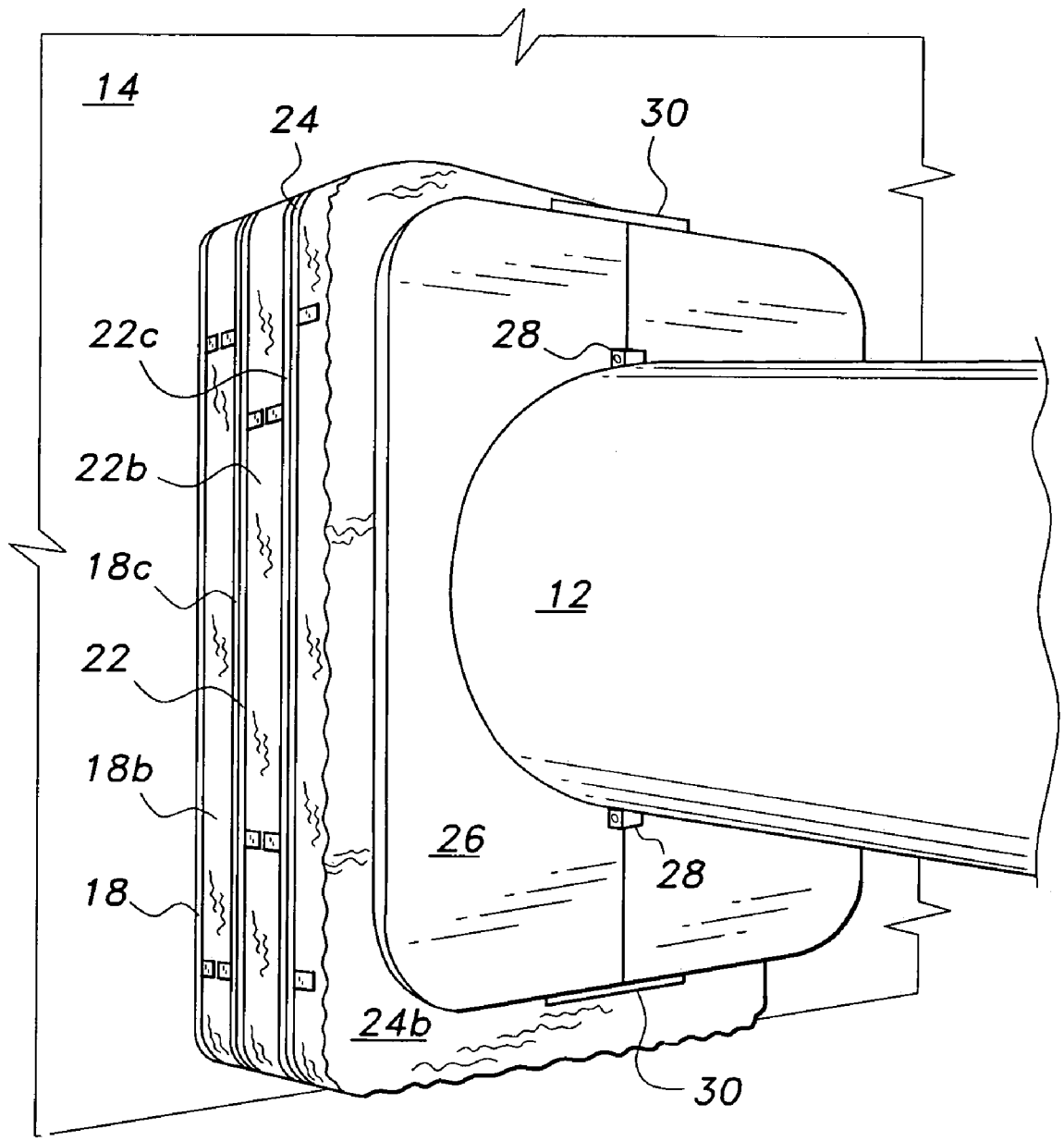
FIG. 6 is a partial, perspective view showing the seal ring positioned on the conduit according to the present invention.
Figure 7:
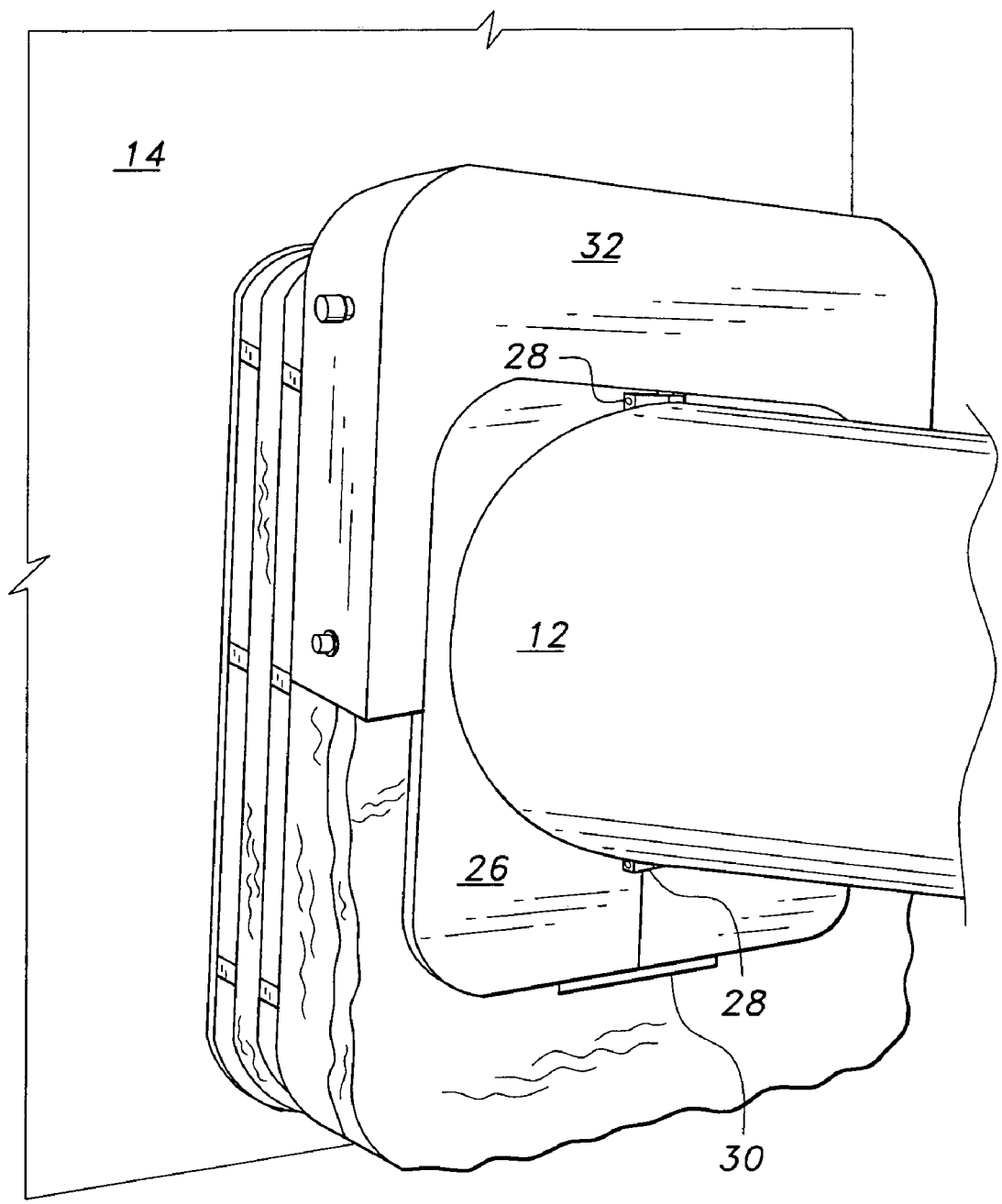
FIG. 7 is a partial, perspective view showing the upper half of the containment housing positioned over the sealing ring according to the present invention.
Figure 8:
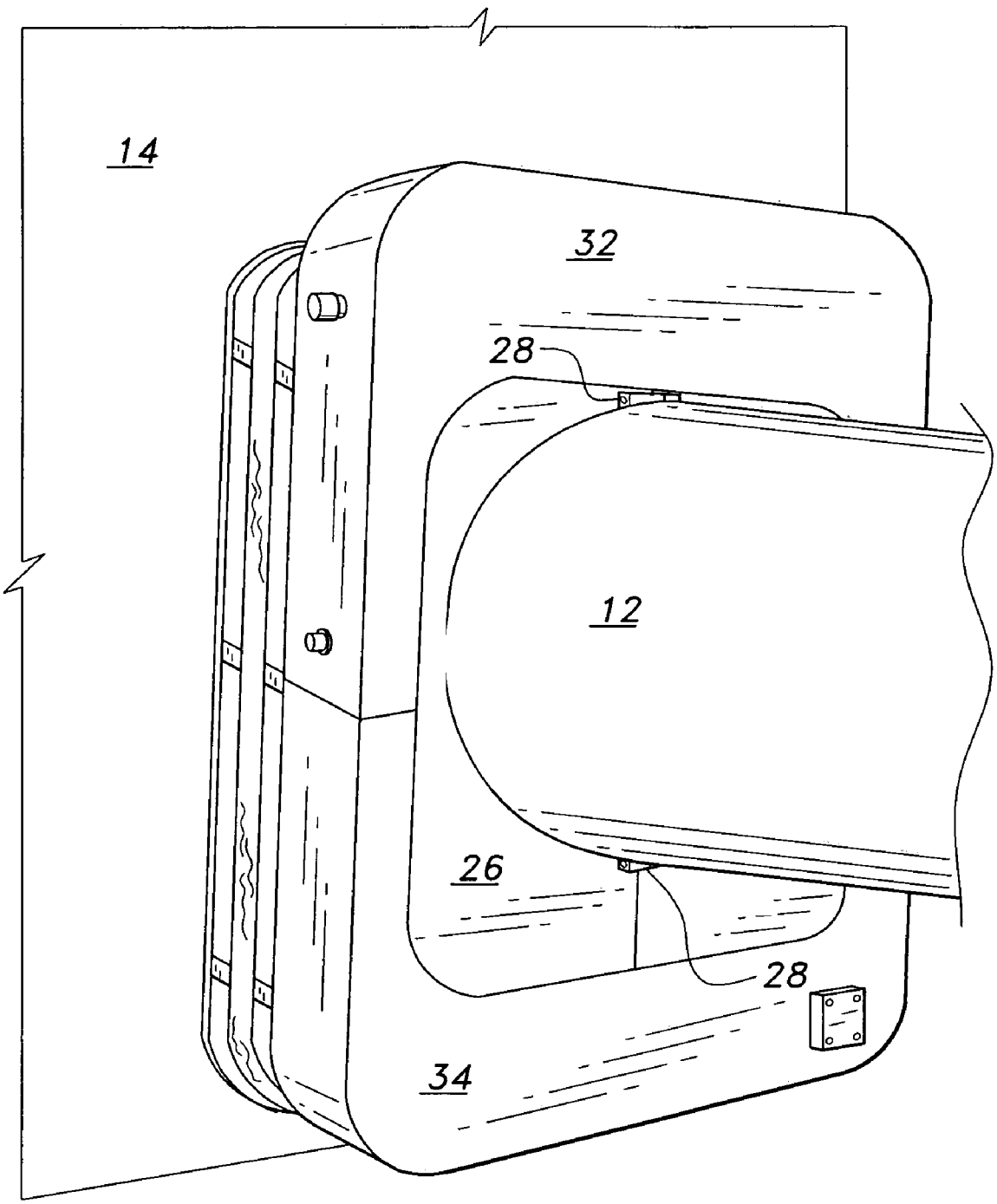
FIG. 8 is a partial, perspective view showing the entire containment housing positioned over the sealing ring according to the present invention.
Figure 9:
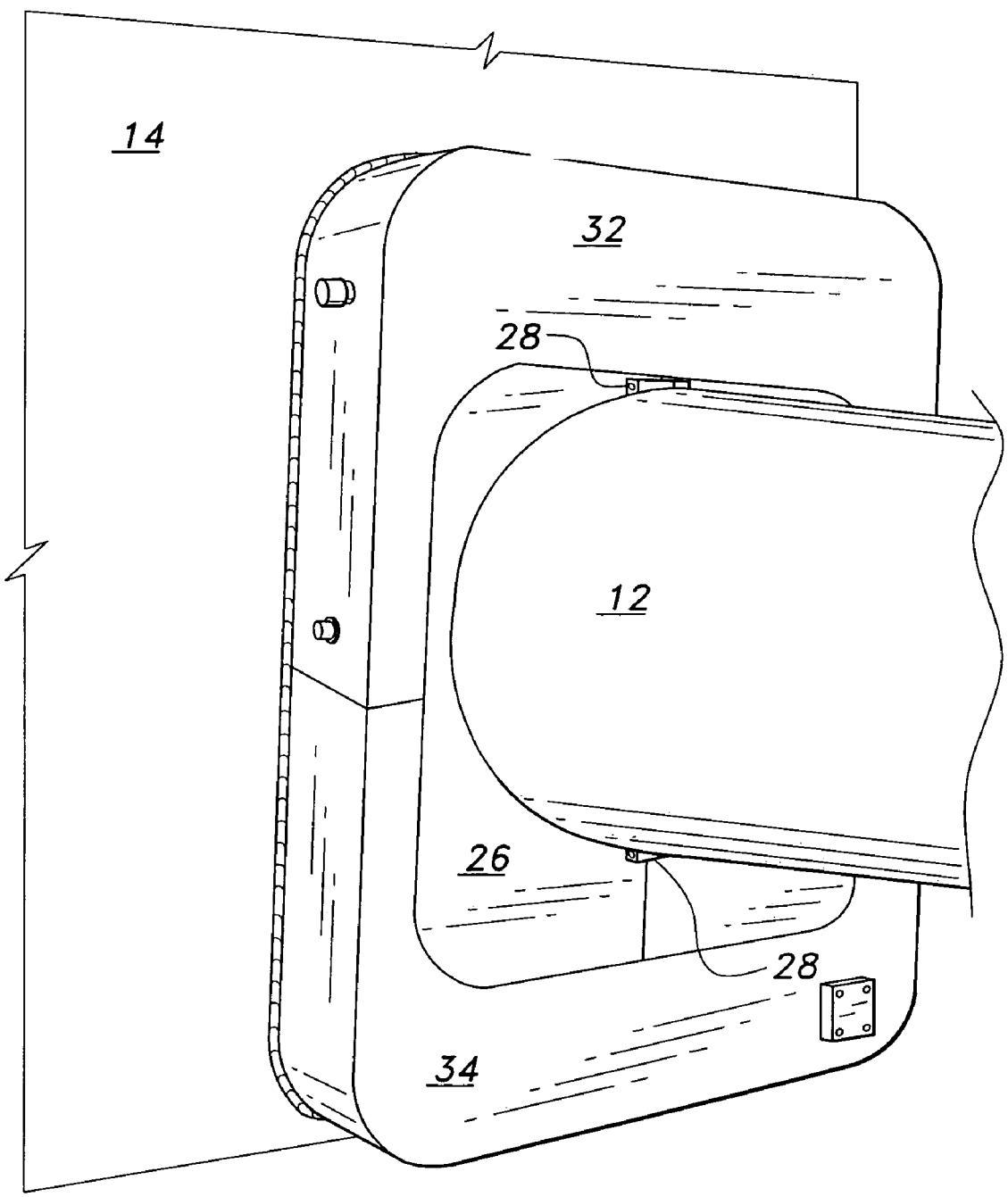
FIG. 9 is a partial, perspective view showing the entire containment housing seal welded to the casing according to the present invention Similar reference characters denote corresponding features consistently throughout the attached drawings.

Attention is now directed to FIGS. 3-9 wherein the assembly of the above-described serial arrangement is more clearly illustrated. FIG. 3 illustrates a partial assembly of the casing pillow wherein sheet 18 is initially mounted on conduit 12. Tabs 18d are employed to attach sheet 18 to sheet 18c and sandwich insulation material 18b therebetween. In FIG. 4 sheet 18 is halved along a vertical axis. Both sheets include angle members 19, which angle members are adapted to engage conduit 12 and prevent the edges of the sheet from being crushed. FIG. 5 shows a sheet 22 halved along a horizontal axis. Tabs 22d and angle members 23 perform respective functions similar to tabs 18d and angle members 19. FIG. 6 shows the seal pillow installed wherein split seal ring 26 abuts insulation 24b and sheet 24. FIGS. 7 and 8 show the arrangement of the containment housing installed on the split seal ring 26. The splits of the seal ring are attached at 28. Additionally, a bar 30, at the top and bottom, (FIG. 6) is fastened to the two halves of the split to hold the halves together. A containment housing having upper and lower halves 32, 34 is disposed over and abuts seal ring 26. The containment housing has a groove (not shown) in which the seal ring 26 slides. Containment housing 32,34 is positioned around the periphery of the serially abutting seal ring and the first, second and third insulation pillows. FIG. 9 shows the containment housing welded to casing 14.

It is to be understood that the present invention is not limited to the embodiment described above, but encompasses any and all embodiments within the scope of the following claims.

We claim:

1. An expansion seal for mounting on a conduit extending through a casing of pressure vessel, comprising:
    first, second and third insulation pillows serially arranged on said conduit, said third insulation pillow terminating in an outer end, each of said first and second insulation pillows including first and second metal sheets and insulation material sandwiched between said first and said second metal sheets; and
    a split seal ring structure, said split seal ring structure disposed on said conduit and forming said outer end of said third insulation pillow.

2. The expansion seal for mounting on a conduit according to claim 1, wherein said third insulation pillow comprises:
    a metal sheet having a front face;
    insulation material in abutment with said metal sheet; and
    said split seal ring structure in abutment with said insulation material, whereby said insulation material is sandwiched between said metal sheet and said split seal ring structure.

3. The expansion seal for mounting on a conduit according to claim 1, further including an array of pins disposed on opposed faces of said first and said second metal sheets, whereby said pins hold said insulation material in place.

4. The expansion seal for mounting on a conduit according to claim 2, further including an array of pins disposed on said front face of said metal sheet, whereby said pins hold said insulation material in place.

5. An expansion seal for mounting on a conduit extending through a casing of pressure vessel, comprising:
    first, second and third insulation pillows serially arranged on said conduit, said third insulation pillow terminating in an outer end, wherein each said first and second insulation pillows includes;
    first and second metal sheets;
    insulation material sandwiched between said first and second metal sheets;
    tabs for attaching each first metal sheet to a respective second metal sheet; and
    a split seal ring structure, said split seal ring structure disposed on said conduit and forming said outer end of said third insulation pillow.

6. The expansion seal for mounting on a conduit according to claim 5, wherein each of said first and second metal sheets, have opposed faces and including an array of pins disposed on each of said opposed faces, whereby said pins hold said insulation material in place.

7. The expansion seal for mounting on a conduit according to claim 5, wherein said third insulation pillow comprises:
    a metal sheet, said metal sheet having a front face;
    an array of pins disposed on said front face;
    insulation material in abutment with said front face of said metal sheet; and
    said split seal ring structure in abutment with said insulation material, whereby said insulation material is sandwiched between said metal sheet and said split seal ring structure and whereby said pins hold said insulation material in place.

8. An expansion seal for mounting on a conduit extending through a casing of pressure vessel, comprising:
    first, second and third insulation pillows serially arranged on said conduit, said third insulation pillow terminating in an outer end, wherein each said first and second insulation pillows includes;
    first and second metal sheets;
    insulation material sandwiched between said first and second metal sheets;
    tabs for attaching each first metal sheet to a respective second metal sheet;
    a split seal ring structure, said split seal ring structure disposed on said conduit and forming said outer end of said third insulation pillow; a containment housing positioned adjacent said split seal ring in abutment therewith, said containment housing mounted around a periphery of said split seal ring and enclosing said split seal ring and said first, second and third insulation pillows.

9. The expansion seal for mounting on a conduit according to claim 8, wherein each of said first and second metal sheets, have opposed faces and including an array of pins disposed on each of said opposed faces, whereby said pins hold said insulation material in place.

10. The expansion seal for mounting on a conduit according to claim 8, wherein said third insulation pillow comprises:
    a metal sheet, said metal sheet having a front face;
    an array of pins disposed on said front face; insulation material in abutment with said front face of said metal sheet; and
    said split seal ring structure in abutment with said insulation material, whereby said insulation material is sandwiched between said metal sheet and said split seal ring structure and whereby said pins hold said insulation material in place.

11. The expansion seal for mounting on a conduit according to claim 8, further including angle members mounted on each of said first and second metal sheets for engagement with said conduit.

12. The expansion seal for mounting on a conduit according to claim 8, wherein said containment housing is seal welded to said casing.

* * * * *